(12) United States Patent
Bodor et al.

(10) Patent No.: US 8,401,983 B2
(45) Date of Patent: Mar. 19, 2013

(54) COMBINATION DOMAIN KNOWLEDGE AND CORRELATION MEDIA RECOMMENDER

(75) Inventors: Robert Bodor, Plymouth, MN (US); Aaron Weber, Orono, MN (US)

(73) Assignee: Luma, LLC

( * ) Notice: Subject to any disclaimer, the term of this patent is extended or adjusted under 35 U.S.C. 154(b) by 351 days.

(21) Appl. No.: 12/892,274

(22) Filed: Sep. 28, 2010

(65) Prior Publication Data

US 2012/0078829 A1     Mar. 29, 2012

(51) Int. Cl.
*G06F 17/00* (2006.01)
(52) U.S. Cl. .......................................................... 706/45
(58) Field of Classification Search ...................... 706/47; 725/46
See application file for complete search history.

(56) References Cited

U.S. PATENT DOCUMENTS

| 7,966,632 B1 * | 6/2011 | Pan et al. ........................ 725/46 |
| 2009/0064229 A1 * | 3/2009 | Morris ............................ 725/46 |

* cited by examiner

*Primary Examiner* — Jeffrey A Gaffin
*Assistant Examiner* — Ola Olude Afolabi
(74) *Attorney, Agent, or Firm* — Dahl IP, LLC (57) ABSTRACT

Media is recommended to a user based on domain knowledge and correlation-based recommendation scores. A domain knowledge-based recommendation score is calculated for a user, and a correlation-based recommendation score is calculated for the user. A user recommendation score is calculated for the user regarding a media item, derived from the domain knowledge-based recommendation score and the correlation-based recommendation score. One or more media items are recommended to the user, such as by ordering or selecting media based on their user recommendation scores.

21 Claims, 5 Drawing Sheets

|  | DIE HARD | RAMBO | TERMINATOR | NOTEBOOK | LETTERS TO JULIET | LOVE ACTUALLY |
|---|---|---|---|---|---|---|
| USER 1 | 1 | 5 |  |  |  |  |
| USER 2 | 4 | 2 | 3 | 5 | 4 | 2 |
| USER 3 | 2 | 4 |  |  |  | 5 |
| USER 4 | 2 | 4 |  | 5 |  |  |

5=LOVED; 1=DIDN'T LIKE

Fig. 1

| CATEGORY | ITEM A | ITEM B |
|---|---|---|
| MOOD ▲ | | |
| ATMOSPHERIC | 1 | 7 |
| SUSPENSEFUL | 4 | 0 |
| STYLIZED | 5 | 6 |
| CAPTIVATING | 7 | 2 |
| GLOOMY | 8 | 8 |
| TENSE | 2 | 9 |
| CONTEMPLATIVE | 5 | 3 |
| BLEAK | 5 | 1 |
| OFFBEAT | 5 | 1 |
| MIND BENDING | 9 | 4 |
| CLEVER | 2 | 4 |
| SCARY | 6 | 7 |
| PLOT ▽ | | |
| GENRES ▽ | | |
| TIME/PERIOD ▽ | | |
| AUDIENCE ▽ | | |
| PRAISE ▽ | | |
| STYLE ▽ | | |
| BASED ON ▽ | | |

SEARCH FOR TITLE, ACTOR OR DIRECTOR

| HOME | MY SAVED | MY RECOMMENDED | ALL MOVIES & TV |

YOUR TASTE PROFILE | HELP | SETTINGS | SIGN OUT

DIE HARD ~ 401

RECOMMENDED TITLES SIMILAR TO DIE HARD

1988   132 MINUTES   CROWD 82   FRIENDS 82
RATED 100   SAVE   RECOMMEND   WATCH

TYPE IN A SIMILAR TITLE TO RECOMMEND
TO SOMEONE WHO ENJOYS DIE HARD

RECOMMEND SIMILAR

DIE HARD

NYPD COP JOHN MCCLANE'S (BRUCE WILLIS) PLAN TO RECONCILE WITH HIS ESTRANGED WIFE, HOLLY (BONNIE BEDELIA)...

402 — WOULD YOU ALSO RECOMMEND THE FOLLOWING SIMILAR TITLES TO SOMEONE WHO ENJOYS DIE HARD?

STARRING
BRUCE WILLIS, ALAN RICKMAN, BONNIE BEDELIA...

☐ LIVE FREE DIE HARD
  2007                    YES    NO

RELATED VIDEO

☐ CON AIR
  1997                    YES    NO

GENRES
ACTION & ADVENTURE

☐ DIE HARD WITH A VENGEANCE
  1995                    YES    NO

DIRECTOR
JOHN MCTIERNAN

☐ DIE HARD 2: DIE HARDER
  1990                    YES    NO

FRIENDS    BUY        RENT
           AMAZON    NETFLIX

☐ G.I. JOE THE RISE OF COBRA
  2009                    YES    NO

404 ~
👤 ROB   82

☐ THE TERMINATOR
  1984                    YES    NO

👤 STEVE   RECOMMEND

403 ~ HELP US GET SMARTER. ARE THE TITLES BELOW ALSO GOOD SIMILAR TITLES TO RECOMMEND TO SOMEONE WHO LIKES DIE HARD?

☐ SWEET JUSTICE
  1992                    YES    NO

☐ THE HUNT FOR EAGLE ONE: CRASH POINT
  2006                    YES   (NO)

☐ FIELD OF DREAMS
  1989                    YES    NO

☐ SHOOT TO KILL
  1988                   (YES)   NO

☐ PRIDE FC: THE RETURN OF THE WARRIORS
  2001                    YES    NO

☐ GROUNDHOG DAY
  1993                    YES   (NO)

COMBINATION DOMAIN KNOWLEDGE AND CORRELATION MEDIA RECOMMENDER

FIELD

The invention relates generally to a media recommendation engine, and more specifically to a combined domain knowledge and correlation media recommendation system and method.

BACKGROUND

The rapid growth of the Internet and the proliferation of inexpensive digital media devices have led to significant changes in the way media is bought and sold. Online vendors provide music, movies, and other media for sale on websites such as Amazon, for rent on websites such as Netflix, and available for person-to-person sale on websites such as EBay. The media is often distributed in a variety of formats, such as a movie available for purchase or rental on a DVD or Blu-Ray disc, for purchase and download, or for streaming delivery to a computer, media appliance, or mobile device.

Internet companies that provide media such as music, books, and movies derive profit from their sales, and it is in their best interest to sell customers multiple items or subscriptions to provide an ongoing stream of profits. Netflix, for example, provides a subscription service to customers enabling them to rent or stream movies, and profits as long as subscribers continue to find enough new movies to watch to remain a subscriber. Pandora provides streaming audio in a customized music station format based on a customer's music preferences, deriving profit from either subscriptions or from advertising placed in limited free services. Amazon derives the majority of its profits from sale of physical media, and increases its profit from providing a customer with media recommendations similar to items that a customer has already purchased.

These media recommendations are typically made by employing a recommendation engine to identify media that is similar to other media in which a customer has shown an interest in, such as by purchasing, renting, or rating other media. Pandora, for example, uses an expert's characterization of a song using attributes such as structure, instrumentation, rhythm, and lyrical content to produce domain knowledge data for each song, and provides streaming songs matching identified customer preferences for one or more distinct customized stations based on its domain knowledge-based recommendation engine. Other media providers such as Netflix provide correlation-based recommendations, where user preferences for similar movies over a broad base of users and media are used to find preference correlation between the media and users in the database to recommend media correlated to other media a customer has liked.

Because the number of items purchased or the length of a subscription are related to the value a customer receives in continuing to interact with a media provider, it is in the provider's best interest to provide media recommendations that are accurate and well-suited to its customers. It is therefore desirable to provide the best quality media recommendations possible in a variety of media commerce environments.

SUMMARY

One example embodiment of the invention comprises a media recommendation system and method in which media is recommended to a user based on domain knowledge and correlation-based recommendation scores. A domain knowledge-based recommendation score is calculated for a user, and a correlation-based recommendation score is calculated for the user. A user recommendation score is calculated for the user regarding a media item, derived from the domain knowledge-based recommendation score and the correlation-based recommendation score. One or more media items are recommended to the user, such as by ordering or selecting media based on their user recommendation scores.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention.

Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to describe these example embodiments. Features or elements shown in various examples described herein can be combined in ways other than shown in the examples, and any such combination is explicitly contemplated to be within the scope of the invention. The following detailed description does not, therefore, limit the scope of the invention, which is defined only by the appended claims.

Recommendation of media such as books, movies, or music that a customer is likely to enjoy can improve the sales of websites such as Amazon, improve the subscription rate and duration of rental services such as Netflix, and help the utilization rate of advertising-driven services such as Pandora. Although each of these examples derive their revenue from providing media in different ways, they all benefit from providing good quality recommendations to customers regarding potential media purchases, rentals, or other use. Similarly, knowledge of a user's preferences and interests can help target advertising that is relevant to a particular user, such as advertising horror movies only to those who have shown an interest in honor films, targeting country music advertising toward those who prefer country to rap or pop music, and presenting book advertising to those who have shown a preference for similar books.

Media recommendations such as these are typically made by employing a recommendation engine to identify media that is similar to other media in which a customer has shown an interest in, such as by purchasing, renting, or rating other media. Some websites, such as Netflix, ask a user to rank dozens of movies upon enrollment so that the recommendation engine can provide meaningful results. Other websites such as Amazon rely more upon a customer's purchase history and items viewed during shopping. Pandora differs from these approaches in that a user can rate relatively few pieces of media, and is provided a broad range of potentially similar media based on domain knowledge of the selected media items.

Pandora achieves this by using an expert's characterization of a song using attributes such as structure, instrumentation, rhythm, and lyrical content to produce domain knowledge data for each song, and provides streaming songs matching identified customer preferences for one or more distinct customized stations based on its domain knowledge-based recommendation engine. Other media providers such as Netflix provide correlation-based recommendations, where user preferences for similar movies over a broad base of users and media are used to find preference correlation between the media and users in the database to recommend media correlated to other media a customer has liked.

Because the number of items purchased or the length of a subscription are related to the value a customer receives in continuing to interact with a media provider, it is in the provider's best interest to provide media recommendations that are accurate and well-suited to its customers. It is therefore desirable to provide the best quality media recommendations possible in a variety of media commerce environments.

Figure 1:
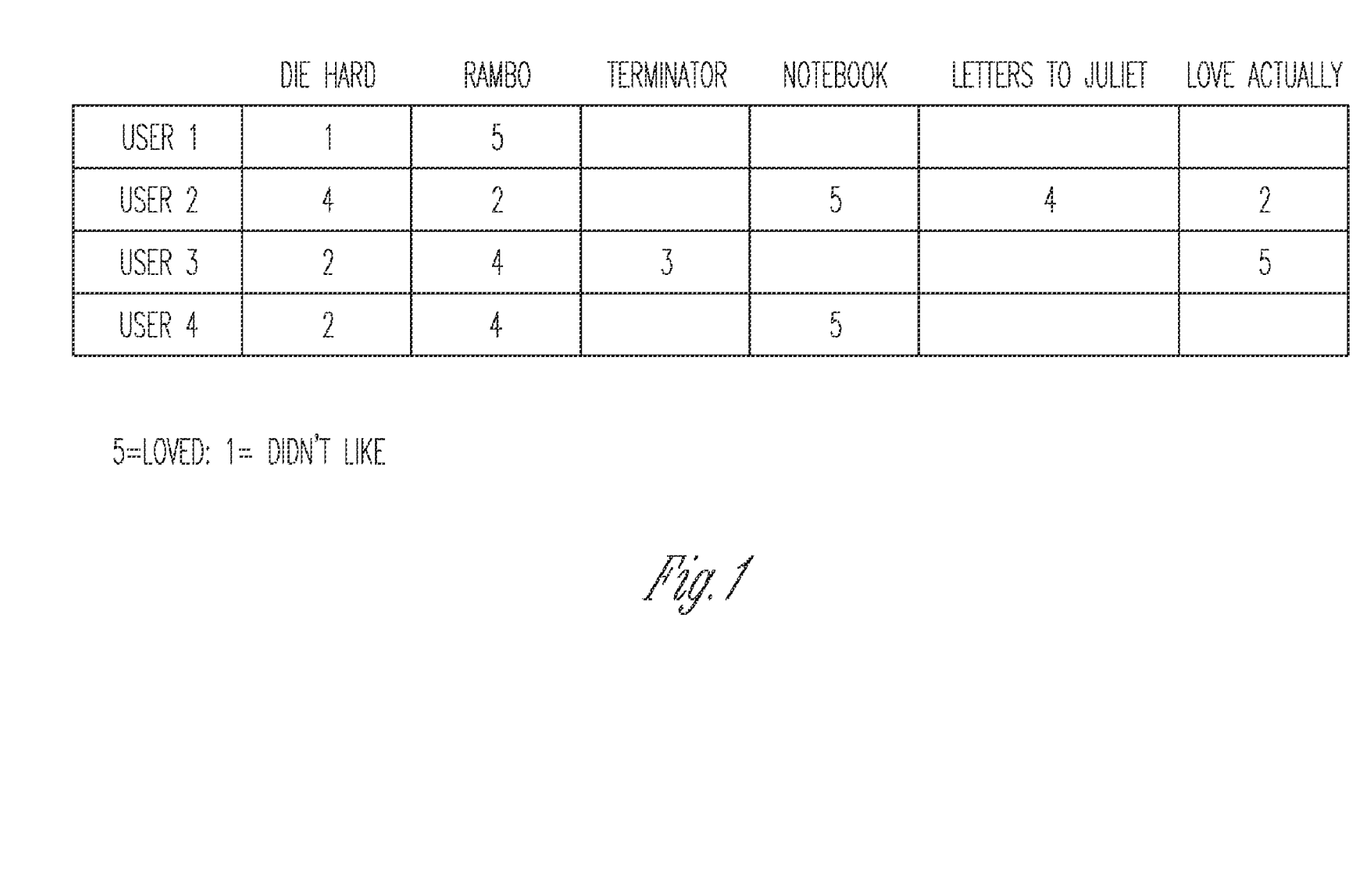
FIG. 1 shows a correlation-based recommendation scoring system, consistent with an example embodiment of the invention.

FIG. 1 shows a correlation recommendation example. Here, four users have provided ratings for some of six movies, in a simplified correlation environment. Three of the movies are action movies, including Die Hard, Rambo, and The Terminator, and three of the movies are romance movies, including The Notebook, Letters to Juliet, and Love Actually. Not every user has rated every movie, much as in a real ranking environment such as Netflix, and the correlation recommendation engine uses the knowledge it does have to predict the likely movie ranking for a user's unranked movies.

Correlation-based recommendation engines typically look at each user and their score correlation to other users, with no further knowledge of the users or movies being ranked. For example, user one and user two have ranked several movies, but have opposite preferences in both action movies and in romantic comedies. User one and user three have similar preferences in action movies, but an unknown level of correlation in romantic comedies. Given that user one and user three's correlation is strong among movies they have both reviewed, user one will likely be recommended a movie that user three has rated high, such as Love Actually, rather than an action movie user three has rated as average, such as Terminator.

This overlooks the lack of knowledge regarding user one's preferences for romantic movies. One may even reasonably infer that because user one has not rated any romantic movies, it is a genre that the user does not prefer to view, and so recommending a movie such as The Notebook based on user four's preferences or Love Actually based on user three's preferences is likely but not particularly meaningful.

Further, user four has a reasonably strong correlation to user three's choices in action movies, but they have no rankings in common regarding romantic movies so no established correlation. A traditional correlation engine would spot the strong action movie correlation, and recommend Love Actually to user four despite a lack of romantic movie correlation between the users. User four does have a strong romantic movie correlation to user two based on a preference for The Notebook, but their disagreement in action movies will prevent a typical correlation engine from recommending Letters to Juliet to user 4 based on user 2's high ranking and similar romantic movie preferences.

Correlation based methods such as these do not encode domain knowledge, such as movie genre, and so are unable to make a recommendation based on such factors. Further, the movie genre is itself a movie characteristic that is fairly broad, and has limited usefulness in predicting or recommending other media. User tastes can be very subtle, so services that do rely upon domain knowledge characteristics such as Pandora typically rely on tens of different media characteristics to make recommendations.

Some embodiments of the invention seek to improve upon methods such as these by addressing correlation flaws, taking domain knowledge such as movie genre and other more detailed characteristics into account when providing recommendations to consumers.

Figure 2:
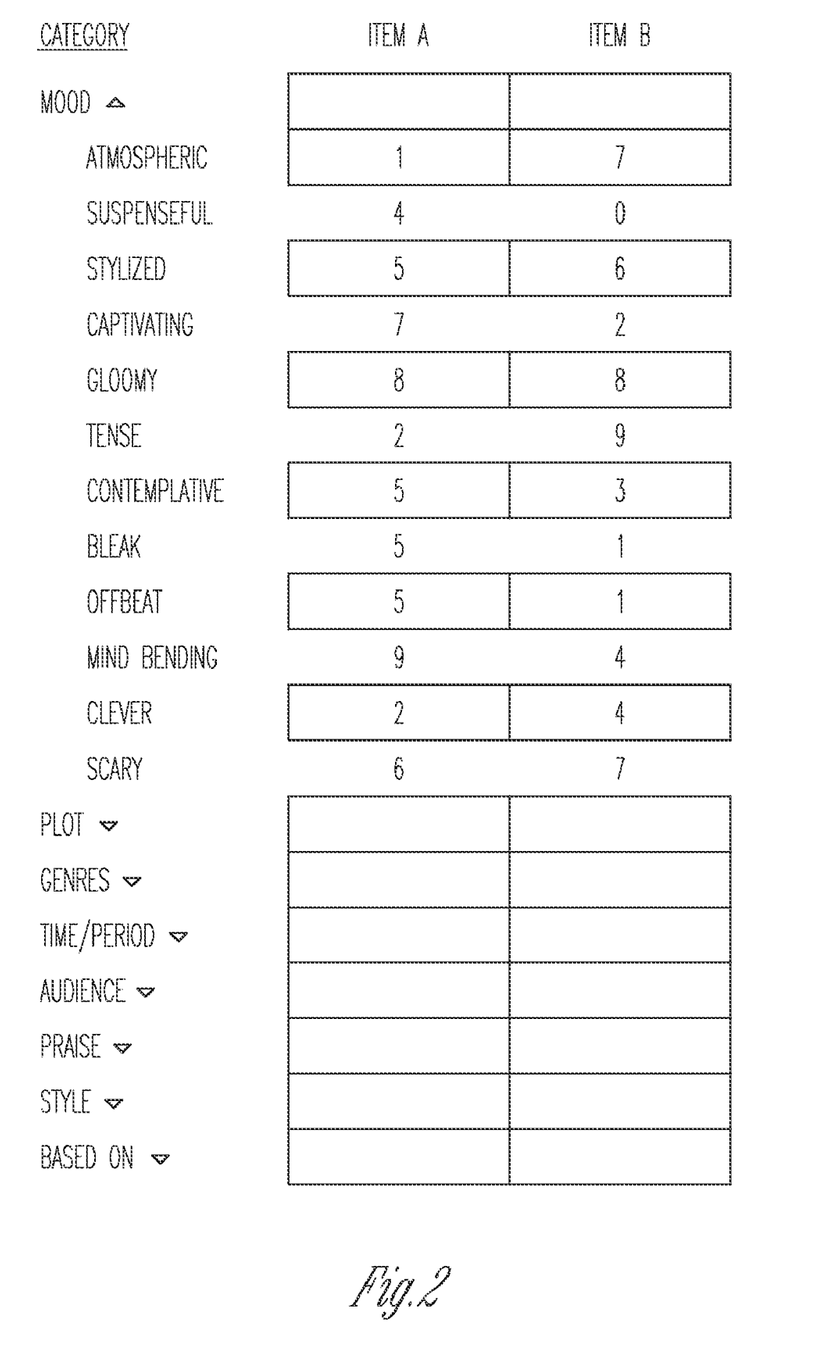
FIG. 2 shows a domain knowledge-based scoring system, consistent with an example embodiment of the invention.

FIG. 2 shows an example of a domain-based movie recommendation data set, similar to what is employed in Pandora's music station song selection correlation engine. Here, a number of qualitative characteristics of each movie or other media item are generated and stored in a table. Using movies as an example, the "mood" category lists a variety of mood characteristics, such as suspenseful, clever, bleak, and scary, which can be used to distinguish one type of movie from another. Other categories of characteristics include plot, genre, style, and other such categories, such that a wide range of characteristics are known for each media item in the media database.

This is somewhat problematic in practice in that Pandora's method requires manual classification or rating of each media item by at least one expert, and may require different experts for each genre or multiple experts per item to produce consistently accurate results. It can also result in a problem that has plagued Pandora's widespread acceptance, in that the recommendation engine becomes good at recommending media that is all very similar but can be poor at suggesting interesting new media that is not very nearly the same as prior media.

Figure 3:
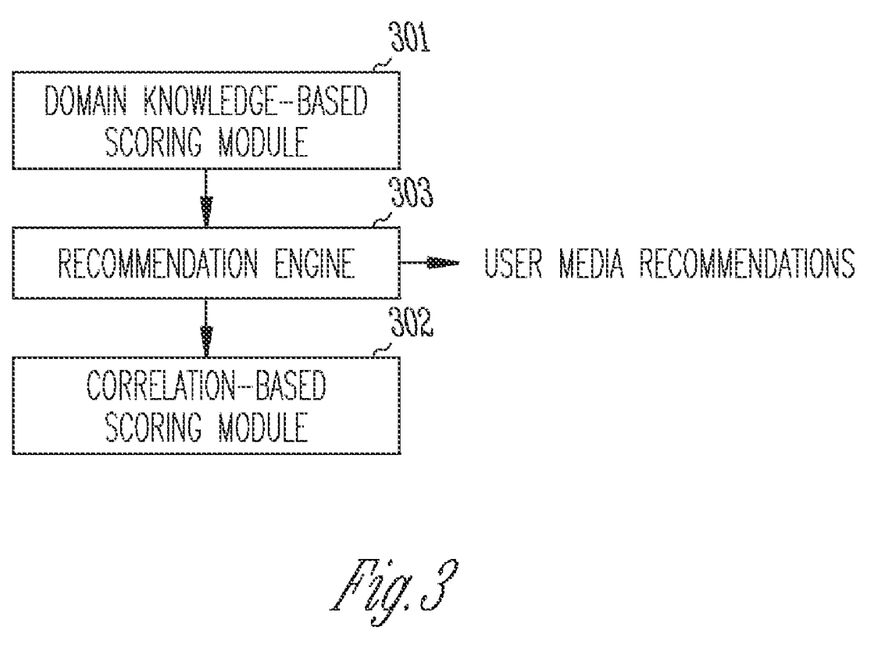
FIG. 3 shows a media recommendation system in which a user media recommendation is derived from domain knowledge-based and correlation-based recommendation scoring, consistent with an example embodiment of the invention.

One example of a recommendation engine constructed to address the problems with currently existing recommendation engines such as these is shown in FIG. 3. Here, a domain knowledge-based scoring module shown at 301 provides a domain knowledge-based score for media items, and a correlation-based scoring module provides a correlation-based score as shown at 302. A recommendation engine 303 employs the scores from both the domain knowledge-based scoring module and the correlation-based scoring module, producing a recommendation score for the media items for particular users.

Combination of the correlation-based scores and domain knowledge-based scores is a function of the two scores, which in various embodiments are multiplied, added, averaged, or otherwise processed such that both the correlation-based score and domain knowledge-based score are considered in combination to produce a user recommendation score that can be used to select media to recommend to a particular user. In further embodiments, the recommendation scores are combined in non-linear ways, such as using the domain knowledge ranking score between media item pairs as a filter on correlation scores.

In a more detailed example, a media library is processed user by user, computing a recommendation engine score for each media item not previously viewed or ranked by each user, and those media items having the highest recommendation scores are identified for recommendation to the user. In an alternate embodiment, only media items meeting an initial screening criteria, such as meeting a minimum threshold for the domain knowledge-based scoring module (or for the correlation-based scoring module) are fully evaluated to produce a recommendation engine score, avoiding spending scoring resources on media that is statistically improbable or impossible to have a high enough recommendation engine score to be recommended to a particular user.

The correlation-based scoring module 302 in some embodiments works in a manner similar to that described with respect to FIG. 1, but in other embodiments separates correlation for different types of media, different genres, or by other such differences between media. This helps resolve some of the problems identified in FIG. 1's example, such as making romance movie recommendations based on similar preferences in action movies.

In a more detailed example, a variety of algorithms are considered, or the variables in an algorithm are weighted, to optimize the recommendation algorithm both for the user base as a whole and for each user. Performance of an algorithm can be evaluated implicitly such as by observing user behavior, or explicitly such as by asking the user to rate the results of each of two or more algorithms.

In a further example, users may be clustered into groups that are found to fit various algorithms particularly well, such that each user may be associated with one of several correlation algorithms that best predict the user's preferences. Algorithms vary based on a variety of characteristics and weightings, such as the following factors:

q=quality of the movie (average crowd rating, dampened by v2)
  s1=preferences toward similar movies (dampened by t1)
  f1=similarity to favorite (five star) movies
  c1=preference toward creators (directors, writers, actors, etc)
  g=preferences toward the genre
  o=preferences toward other metadata (year, rating, etc.)
  t1=time decay factor based on time since movie was popular/relevant
  b=buzz factor based on current activity
  m1=mood, such as derived from recent similar media activity
  v1=saved movies
  h=recent user activity history
  w=watched movies
  p=popularity of movies among user base
  f2=preference of friends (damped by s2,a, and m2)
  t2=total number of media item ratings
  v2=volume of crowd ratings
  c2=collaborative filter (correlation score)
  s2=similarity of two users
  m2=users match making score
  a=acceptance rate of user's recommendations
  u=other user recommends movie to you (damped by s2, a, and m2)
  x=other info (social profile info, demographics, etc.)

The domain knowledge-based scoring module 301 in some embodiments also varies significantly from the example given in FIG. 2, such as by employing user inputs regarding similarity between movies rather than expert input to determine the relevant characteristics of movies. In one example, characteristics are not explicitly listed and ranked as in the example of FIG. 2, but movies are paired as having a similar desirability to users by the users themselves.

Figure 4:
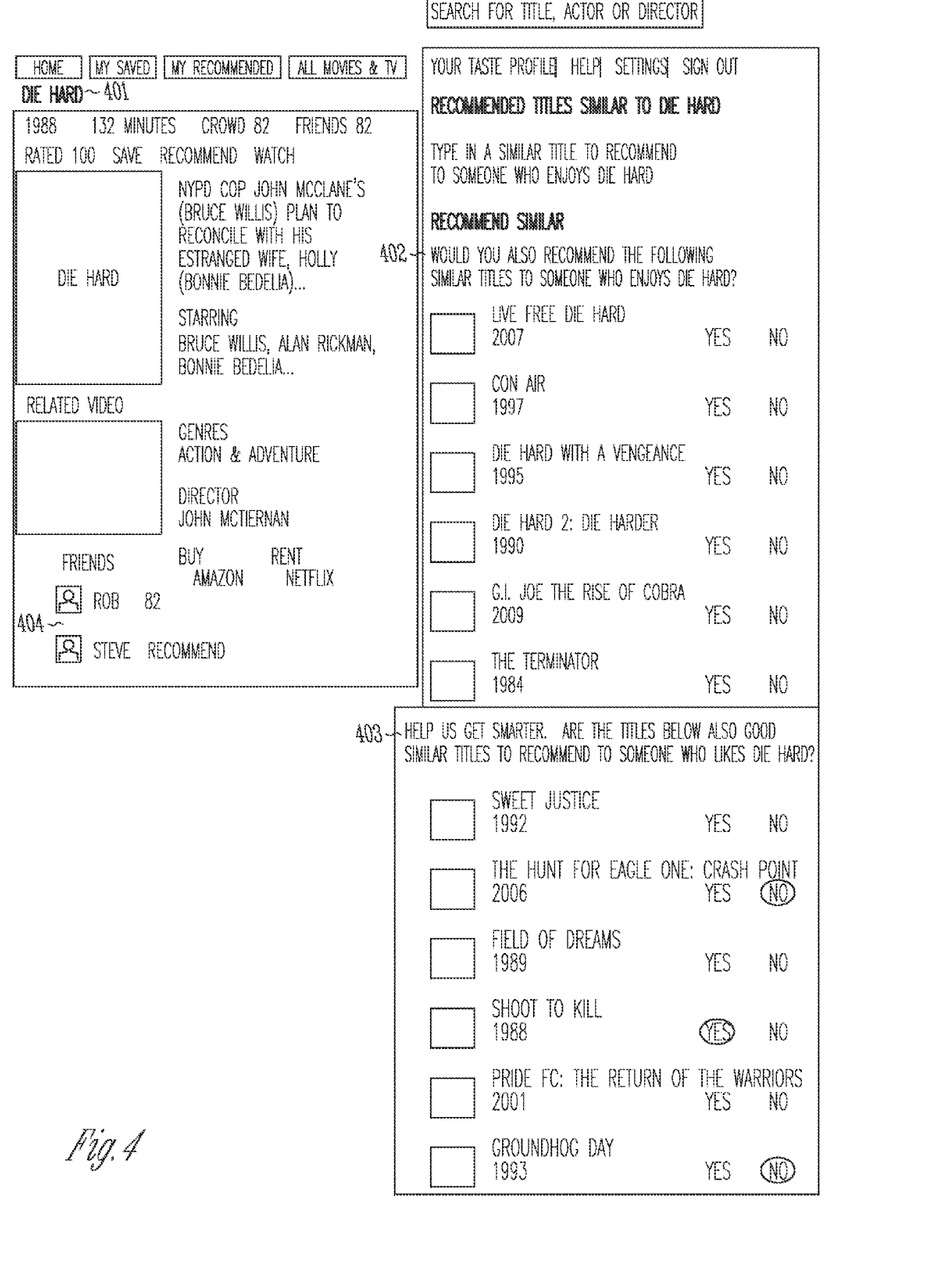
FIG. 4 is a screen image illustrating derivation of domain knowledge media information from user recommendation of similar media items, consistent with an example embodiment of the invention.

FIG. 4 is a screen image of such a user-based domain knowledge scoring system, consistent with an example embodiment of the present invention. Information regarding a selected movie is shown at 401, and the user is prompted to indicate whether they would recommend a selection of other movies to someone who enjoyed Die Hard at 402. In this example all the movies listed at 402 are somewhat similar to Die Hard, and user voting is used to determine which of these similar movies are most similar to Die Hard. For example, a user may select "Yes" to Con Air and select "No" to Face/Off, increasing the similarity ranking between Die Hard and Con Air while decreasing the similarity ranking between Die Hard and Face/Off.

In a further example, it is not known whether some movies are similar to Die Hard, or are unrelated. At 403, the user is further prompted to indicate which of a broader selection of movies are similar to Die Hard, and would be enjoyed by someone who also enjoyed Die Hard. For example, a user may select "Yes" for Shoot to Kill, but select "No" for Groundhog Day, knowing that it is a romantic comedy and has little in common with Die Hard, and also select "No" for The Hunt for Eagle One based on a lack of preference for the movie.

After a number of users have rated movies as being recommended as similar or not relative to Die Hard, percentage similarity or another such similarity score between each pair of movies can be established. This similarity score is used as a domain knowledge score in some embodiments of the invention, effectively using the knowledge and preferences of hundreds or thousands of people to determine whether two overall items are similar.

This method also has advantages over domain knowledge data methods such as expert ranking of characteristics by category as shown in FIG. 2, in that a large staff of experts is no longer needed to rank the relevant media catalog. Instead, the preferences of a wide group of media consumers having an interest in the relevant media item are compiled to produce a domain knowledge similarity ranking between pairs of media items that are likely at least as useful as ranking by a single media expert. Methods involving input of a broad market of consumers rather than a single expert are widely believed to be more accurate, and are therefore likely to improve the quality of domain-based scoring for media recommendation.

If a new or uncommon media item does not have a significant number of pair rankings, it may be difficult to recommend other movies based on a preference for the new movie, or to recommend the new movie to existing users. The new movie in some embodiments is therefore prioritized for selection in user similarity recommendations, such as are shown at 403 and 402 of FIG. 2. If a movie doesn't have a similarity pair ranking with another movie, a "rough" or estimated ranking is also determined in some embodiments using the information that is available, such as known similarity rankings between a third movie and each of the movies in the pair or by using media item meta-data such as genre.

FIG. 4 illustrates a simplified example of establishing a domain knowledge similarity score between movie pairs where no directly acquired pair data exists, by using two or more other pairs linking the two movies. Here, the movie Toy Story is newly added to the media database and has only been ranked relative to two other movies, Cars and Spartacus. Toy Story was ranked to be 95% similar to Cars, but only 4% similar to Spartacus. Although this domain knowledge enables recommendation of Cars as a similar movie and will likely prevent Spartacus from being recommended based on a preference for Cars, it is not directly helpful in recommending other movies such as Finding Nemo or Monsters, Inc., or in avoiding recommending movies such as 300, Gladiator, and Rome.

Because Cars and Spartacus are both better known movies, their pair ratings are well established, as reflected in the percentages linking these movies to the movies in the third row such as Monsters, Inc. and Gladiator. A domain knowledge scoring engine can use this information to establish that if Toy Story is 95% similar to Cars, and Cars is 94% similar to Monsters, Inc., Toy Story is probably very similar to Monsters, Inc. An estimated percentage similarity can be derived by a variety of methods, such as averaging the 95% and 94% similarity ratings, by taking the lower of the two ratings, or by multiplying the percentage ratings together and optionally normalizing the result.

These methodologies can similarly be used to see that Toy Story is not related to movies such as Gladiator, using either Toy Story's 4% similarity to Spartacus and Spartacus's 96% similarity to Gladiator, or Toy Story's 95% similarity to Cars and Cars' 5% similarity to Gladiator. In further examples both of these pair chains are used, as more pair chains can establish a better domain knowledge similarity ranking than a single point of comparison.

Figure 5:
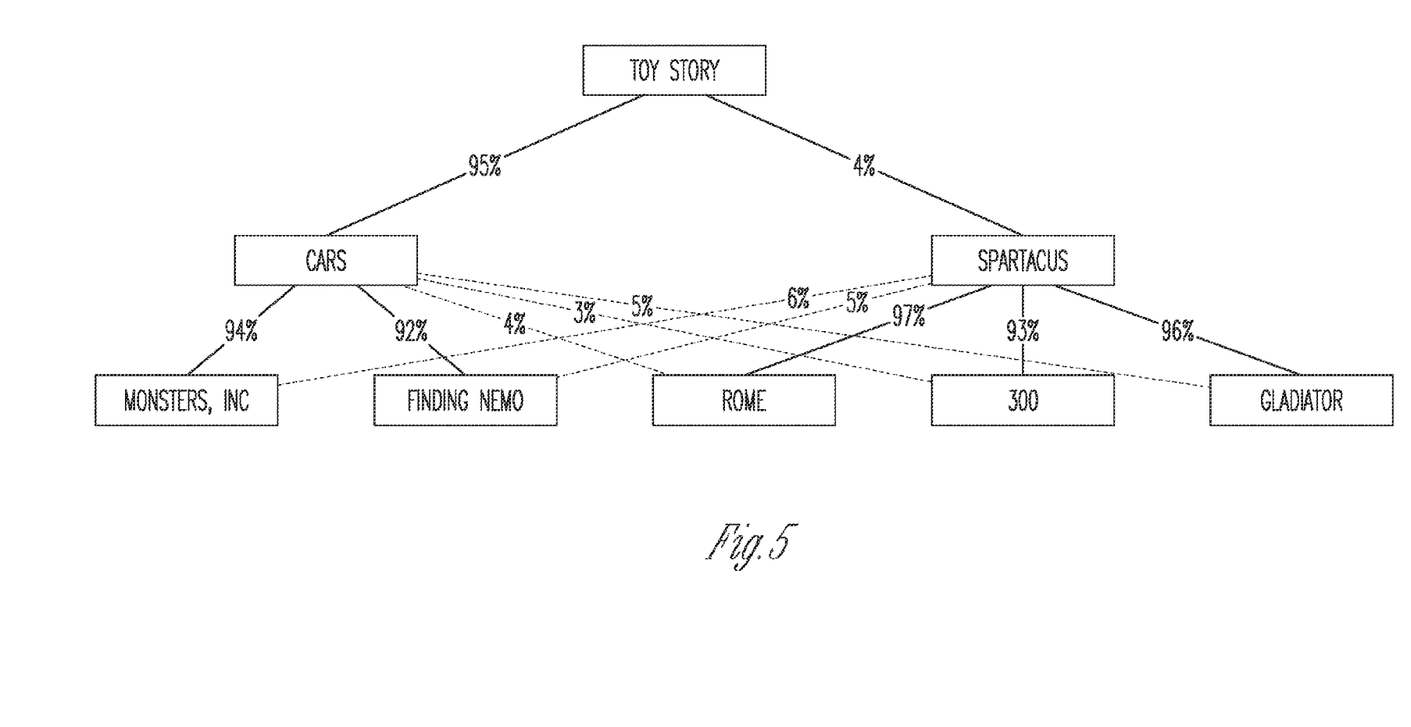
FIG. 5 shows derivation of domain knowledge media pair information using one or more intermediate media items, consistent with an example embodiment of the invention.

The domain knowledge scores produced by methods such as described and shown in the examples of FIG. 2 or FIG. 5, or any other suitable method of producing item-based domain knowledge rankings of media items, are used by a recommendation engine such as that of FIG. 3 to generate media recommendations for a user. Combining domain knowledge-based scoring with correlation-based scoring produces a more meaningful result than using either method alone, resulting in a better user experience and greater success and profit for the media provider.

Although specific embodiments have been illustrated and described herein, any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of providing a media recommendation for a user, comprising:
   calculating a domain knowledge-based recommendation score for the user for a media item;
   calculating a correlation-based recommendation score for the user for the media item;
   deriving a user recommendation score for the media item from the domain knowledge-based recommendation score and the correlation-based recommendation score.

2. The method of providing a media recommendation for a user of claim 1, further comprising selecting one or more media items with the highest user recommendation scores not previously rated by the user to recommend to the user.

3. The method of providing a media recommendation for a user of claim 1, wherein calculating a correlation-based recommendation score comprises deriving the correlation-based recommendation score from at least one of items with similar user score ratings and users with similar item score ratings.

4. The method of providing a media recommendation for a user of claim 1, wherein calculating a domain knowledge-based recommendation score comprises deriving the domain knowledge-based recommendation score from other user indications of media that the other users would recommend to someone who enjoyed a specific media item.

5. The method of providing a media recommendation for a user of claim 1, wherein deriving a user recommendation score from the domain knowledge-based recommendation score and the correlation-based recommendation score further comprises at least one of multiplying, averaging, or adding the domain knowledge-based recommendation score and the correlation-based recommendation score.

6. The method of providing a media recommendation for a user of claim 1, wherein calculating a correlation-based recommendation score comprises employing an optimized correlation-based recommendation algorithm based on correlation between users in a plurality of media item characteristics.

7. A media recommendation engine, comprising:
   at least one processor;
   a domain knowledge-based scoring module operable when executed on the at least one processor to calculate a domain knowledge-based recommendation score for a user;
   a correlation-based scoring module operable to when executed on the at least one processor calculate a correlation-based recommendation score for the user; and
   a user recommendation scoring module operable when executed on the at least one processor to derive a user recommendation score for the user regarding a media item from the domain knowledge-based recommendation score and the correlation-based recommendation score.

8. The media recommendation engine of claim 7, further comprising a media recommendation module operable when executed on the at least one processor to select one or more media items with the highest user recommendation scores not previously rated by the user to recommend to the user.

9. The media recommendation engine of claim 7, wherein calculating a domain knowledge-based recommendation score comprises deriving the domain knowledge-based recommendation score from domain knowledge media pair information derived using one or more intermediate media items, consistent with an example embodiment of the invention.

10. The media recommendation engine of claim 7, wherein calculating a domain knowledge-based recommendation score comprises deriving the domain knowledge-based recommendation score from other user indications of media that the other users would recommend to someone who enjoyed a specific media item.

11. The media recommendation engine of claim 7, wherein deriving a user recommendation score from the domain knowledge-based recommendation score and the correlation-based recommendation score further comprises at least one of multiplying, averaging, or adding the domain knowledge-based recommendation score and the correlation-based recommendation score.

12. The media recommendation engine of claim 7, wherein calculating a correlation-based recommendation score comprises employing an optimized correlation-based recommendation algorithm based on correlation between users in a plurality of media item characteristics.

13. A computerized system, comprising:
   at least one processor;
   a domain knowledge-based scoring module operable when executed on the at least one processor to calculate a domain knowledge-based recommendation score for a user;

a correlation-based scoring module operable when executed on the at least one processor to calculate a correlation-based recommendation score for the user;

a user recommendation scoring module operable when executed on the at least one processor to derive a user recommendation score for the user regarding a media item from the domain knowledge-based recommendation score and the correlation-based recommendation score; and a media recommendation module operable when executed on the at least one processor to select one or more media items with the highest user recommendation scores to recommend to the user.

14. The computerized system of claim 13, wherein calculating a domain knowledge-based recommendation score comprises deriving the domain knowledge-based recommendation score from other user indications of media that the other users would recommend to someone who enjoyed a specific media item.

15. The computerized system of claim 13, wherein calculating a correlation-based recommendation score comprises employing an optimized correlation-based recommendation algorithm based on correlation between at least one of media items and users in a plurality of media item characteristics.

16. The computerized system of claim 13, wherein deriving a user recommendation score from the domain knowledge-based recommendation score and the correlation-based recommendation score further comprises at least one of multiplying, averaging, or adding the domain knowledge-based recommendation score and the correlation-based recommendation score.

17. A non-transitory machine-readable storage medium with instructions stored thereon, the instructions when executed operable to cause a computerized system to:

calculate a domain knowledge-based recommendation score for a user;

calculate a correlation-based recommendation score for the user;

derive a user recommendation score for the user regarding a media item from the domain knowledge-based recommendation score and the correlation-based recommendation score; and select one or more media items with the highest user recommendation scores to recommend to the user.

18. The machine-readable medium of claim 17, wherein calculating a domain knowledge-based recommendation score comprises deriving the domain knowledge-based recommendation score from other user indications of media that the other users would recommend to someone who enjoyed a specific media item.

19. The machine-readable medium of claim 17, wherein calculating a correlation-based recommendation score comprises employing an optimized correlation-based recommendation algorithm based on correlation between at least one of media items and users in a plurality of media item characteristics.

20. The machine-readable medium of claim 17, wherein deriving a user recommendation score from the domain knowledge-based recommendation score and the correlation-based recommendation score further comprises at least one of multiplying, averaging, or adding the domain knowledge-based recommendation score and the correlation-based recommendation score.

21. The method of providing a media recommendation for a user of claim 1, wherein calculating a domain knowledge-based recommendation score comprises deriving the domain knowledge-based recommendation score from one or more inputs from other users comprising an indication of similarity between pairs of specific media items.

\* \* \* \* \*